Patented July 10, 1951

2,559,969

UNITED STATES PATENT OFFICE 2,559,969

METHOD OF APPLYING A MASKING COMPOSITION TO A GLASS BASE

Douglas H. Kennedy, Corpus Christi, Tex., assignor to Pittsburgh Plate Glass Company, Allegheny County, Pa., a corporation of Pennsylvania No Drawing. Application February 16, 1950, Serial No. 144,577

5 Claims. (Cl. 117—54)

The present invention relates to masking compositions and more particularly to a masking composition for glass surfaces.

One object of the invention is the provision of a method of masking predetermined portions of a glass surface to protect said portions from adherence thereto of materials applied in processes of forming electrically conductive films on glass.

Another object is the provision of a masking composition adapted to be employed in the protection of predetermined portions of glass surfaces from materials used in applying electrically conductive films to said surfaces.

A further object of the invention is the provision of such a masking composition which is inexpensive, heat resistant and easily removed by washing with water.

An additional object of the invention is the provision of a masking composition which is non-reactive or inert with respect to glass at elevated temperatures.

The achievements of the foregoing and other objectives of the invention will become apparent upon consideration of the following detailed description of the invention.

Glass, in addition to its other useful properties, is a non-conductor of electricity. For many applications, this property is an important asset. However, for some applications it is desirable to obtain relatively high conductivity in predetermined portions of a glass surface while retaining the natural insulative characteristics on adjacent portions. It has been recognized that such glass is useful as a component of electrically defrostable windshields and windows in airplanes, vehicles, and the like. Conductivity is also desirable in certain surfaces of the glass envelope of television tubes and in many other applications.

Processes have been developed for coating glass with an electrically conductive film which utilize metallic chlorides to produce the conductive coating. These processes comprise, in general, heating the glass in a furnace in which temperatures are in the vicinity of 1100° F., and spraying the glass surface so heated with the metallic chloride in the form of a vapor, dispersed liquid, or solution. As the metallic chloride strikes the heated glass, decomposition occurs and as a result a thin, electrically conductive film is deposited on the surface. The film produced is adherent to the glass and is of permanent nature.

In applying films of this character to a glass surface as previously indicated, it is often desired to apply the film in a predetermined pattern. One of the important desiderata in the art, therefore, is to find a masking composition which will protect parts of the glass surface which are to be left free of the electrically conductive film.

Many masking materials have been tried heretofore such as calcium carbonate, calcium oxide, zinc oxide and barium sulfate. These prove unsatisfactory from several standpoints. Either they combine with the glass at the furnace temperatures, are removed by volatilization, or they are difficult or impossible to remove after the conductive film has been applied. The use of various masking tapes, is impractical since they are destroyed at temperatures well below those employed in the practice of the invention.

The present invention is based upon the discovery that a pulverulent mass of a natural mineral, such as feldspar, when applied as a paste or magma to a glass surface, will form an effective temporary mask during the application of metallic chlorides in the production of films as described above. The mask is impermeable to the film forming ingredients, is heat resistant, inert with respect to glass at elevated temperatures, and is easily removed from the glass at the conclusion of the application of the metallic chloride.

Feldspars having the following chemical analysis have been found to be satisfactory in the operation of the invention:

6°–77 parts by weight $SiO_2$
13–23 parts by weight $Al_2O_3$
8–18 parts by weight alkali metal oxide
0.5–0.8 part by weight of an alkali metal borate such as $Na_2B_4O_7$ The dry pulverulent mass is introduced into a liquid medium which contains a solution of one or more wetting agents, such as di-octyl sodium sulfo succinate, an alkyl naphthalene sulfonic acid, or a sulfonated bicarboxy acid ester. The resultant composition when applied to glass and dried, forms a refractory chalk-like coating, inert with respect to the glass and has the additional virtue of being removed easily by rubbing or by washing with water.

The chemical analysis of a typical feldspar suitable for use in the practice of the invention is as follows:

63–65 parts by weight $SiO_2$
16.5–18 parts by weight $Al_2O_3$
9–11 parts by weight $K_2O$
4–5 parts by weight $Na_2O$
0.5–0.8 part by weight $Na_2B_4O_7$ The mineral is usually finely ground, preferably fine enough to pass a 325 mesh screen. This pulverized mass is then introduced into a liquid medium of which the following is a typical example:

75 parts by weight di-octyl sodium sulfo succinate
10 parts by weight methanol
5 parts by weight glycerol
10 parts by weight of a 10% solution of a sulfonated bicarboxy acid ester in water.

The components of the liquid suspending medium are to a large extent volatilized after application to the glass surfaces. Therefore, the medium is susceptible of great variation. For example, any of the wetting agents may be employed satisfactorily. The methyl alcohol content of the solution may be replaced by any volatile saturated aliphatic alcohol. The function of the liquid medium is to form a fluid paste with the solid pulverulent mineral. The fluidity of the paste makes it susceptible of easy application, but at the same time it should possess sufficient coherency or body to remain within the confines of the boundary to be masked. The viscosity of the masking composition is regulated by the addition of water.

In the process of applying an electrically conductive film to predetermined portions of a glass surface, the parts of the glass surface which are to be kept free of the electrically conductive film are coated with the masking solution by spraying, dipping or painting. The masked glass object is then placed in a furnace in which the temperature is regulated at between approximately 1000–1200° F. At these temperatures the liquid medium is volatilized but the masking coating which remains retains its inertness to the glass even at these elevated temperatures. After heating for two minutes, the glass object can be sprayed immediately with a solution of the electrically conductive material. If preferred, the application of the masking material may be accomplished by coating the glass object with the masking composition and permitting the liquid medium to evaporate at atmospheric temperature. Thereafter, the conductive film may be applied at the convenience of the operator.

More particularly, I have found that the invention finds utility in the protection of heated glass surfaces from aqueous solutions of fused stannic chloride, for example, a solution consisting of 1 part by weight water and 10 parts by weight stannic chloride pentahydrate. Used alone, or when incorporated with a small amount of a reducing agent such as phenylhydrazine hydrochloride, this material is capable of depositing an electrically conductive film on glass. However, the invention is also applicable in connection with other transparent electroconductive films, particularly metal oxide films. Thus films herein contemplated may comprise cadmium oxide, zinc oxide, indium oxide, titanium oxide, thallium oxide and other metal oxides which may be prepared for example by using the bromide, chloride or acetate of the corresponding metal. The masking composition provided by the invention is impermeable to the metallic chloride and protects the masked parts of the glass surface, but when the glass is cooled to room temperature it is easily removed by washing with water leaving the glass surface with its film of electrically conductive material in its predetermined pattern.

Although the examples above set forth illustrate the use of the invention in conjunction with a process of coating glass to impart electrical conductance, it will be apparent that the masking composition may be used in other processes such as in the painting of glass or ceramic bodies wherein decorative coatings are baked upon these bodies in a predetermined pattern. The invention finds application in connection with any process where an inert, heat resistant, easily removed masking composition is desired.

Various substitutions in and additions to the composition may be made without departing from the spirit of the invention or the scope of the appended claims.

This application is a continuation-in-part of my copending application Serial No. 677,926, filed June 19, 1946, and now abandoned.

I claim:

1. A method of providing a glass base with a localized electroconductive coating which compromises applying to a portion of the surface of the base a coating of a temperature resistant, removable, pulverulent masking composition of feldspar in a volatile liquid medium, leaving other surfaces of the base uncoated, heating the coated base to a temperature of the order of 1000 to 1200° F., applying stannic chloride to the surface of the heated base whereby an electroconductive coating is deposited upon the exposed surface of the glass, cooling to room temperature, and removing the masking coating from the base by washing with water.

2. A method of providing a glass base with a localized electroconductive coating which comprises applying to a portion of the surface of the base a coating of temperature resistant, removable, pulverulent masking composition of feldspar in a volatile liquid medium, the feldspar having the following approximate chemical analysis:

| | Parts by weight |
|---|---|
| $SiO_2$ | 60 –77 |
| $Al_2O_3$ | 13 –23 |
| Alkali metal oxide | 8 –18 |
| $Na_2B_4O_7$ | 0.5– 0.8 | leaving other surface areas of the base uncoated, heating the coated base to a temperature of the order of 1000 to 1200° F., applying stannic chloride to the surface of the heated base whereby an electroconductive coating is deposited upon the exposed surface of the glass, cooling to room temperature, and removing the masking coating from the base by washing with water.

3. In a process of temporarily masking a glass surface to be protected from stannic chloride applied thereto in the formation of an electrically conductive film, the steps which comprise applying to the portions of the glass surface to be masked a suspension of pulverulent feldspar in a volatile liquid medium, thereafter exposing said surface to a temperature between 1000 to 1200° F., applying the stannic chloride to the hot surface whereby to deposit the electrically conductive film on the glass, and finally removing the masking composition.

4. In a process of temporarily masking a glass surface to be protected from metallic chloride applied thereto in the formation of an electrically conductive film, the steps which comprise applying to the portions of the glass surface to be masked a suspension of pulverulent feldspar in a volatile liquid medium, thereafter exposing said surface to a temperature between 1000 to 1200° F., applying the metallic chloride to the hot surface whereby to deposit the electrically conductive film on the glass, and finally removing the masking composition.

5. In a process of temporarily masking a glass surface to be protected from stannic chloride applied thereto in the formation of an electrically conductive film, the steps which comprise applying to the portions of the glass surface to be masked a suspension of pulverulent feldspar in a volatile liquid medium, the chemical analysis of the feldspar being:

| | Parts by weight |
|---|---|
| $SiO_2$ | 60 –77 |
| $Al_2O_3$ | 13 –23 |
| Alkali metal oxide | 8 –18 |
| $Na_2B_4O_7$ | 0.5– 0.8 | thereafter exposing said surface to a temperature between 1000 to 1200° F., applying the stannic chloride to the hot surface whereby to deposit the electrically conductive film on the glass, and finally removing the masking composition.

DOUGLAS H. KENNEDY.

REFERENCES CITED

The following references are of record in the file of this patent:

UNITED STATES PATENTS

| Number | Name | Date |
|---|---|---|
| 1,698,302 | Goss | Jan. 8, 1929 |

OTHER REFERENCES

Ford-Dana's Manual of Mineralogy, 13th edition, John Wiley & Sons, Inc., New York, 1915, pp. 220–229.